United States Patent Office 3,631,094
Patented Dec. 28, 1971

3,631,094
PROCESS FOR THE PRODUCTION OF AROMATIC POLYCARBOXYLATES
John E. Mahan and Donald G. Kuper, Bartlesville, Okla., assignors to Phillips Petroleum Company
No Drawing. Filed Nov. 20, 1969, Ser. No. 878,529
Int. Cl. C07c 51/00, 51/52
U.S. Cl. 260—515 P
9 Claims

ABSTRACT OF THE DISCLOSURE

Improved catalytic disproportionation of aromatic carboxylates to aromatic polycarboxylates containing at least one additional carboxyl group is achieved by carrying out the catalytic disproportionation process in the presence of a conventional disproportionation catalyst and at least one adjuvant compound of the group having a structural formula of

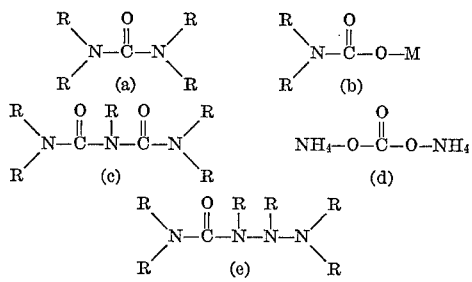

wherein R is hydrogen or an alkyl radical having from 1 to 4 carbon atoms, and M is $NH_4$, Li, Na, K, Rb or Cs.

BACKGROUND OF THE INVENTION

It is known that alkali metal salts of various carboxylic acids having one or more carboxylic groups attached to an aromatic ring system can be converted into salts of the corresponding carboxylic acids having at least one additional carboxyl group in the molecule by thermal conversion or catalytic disproportionation at elevated temperatures and pressures. While such a process has proven industrially attractive for the production of various types of polycarboxylic acids such as terephthalic acid, the process as heretofore practiced suffers from the disadvantage exhibiting relatively low efficiency. In addition, the handling of the high pressure systems to obtain conversion requires the use of expensive high pressure equipment.

It is thus an object of the present invention to provide an improved process for the catalytic formation of polycarboxylic acids.

Another object of the present invention is to provide a process for the formation of alkali metal salts of aromatic polycarboxylic acids.

Another object is to provide an improved catalytic disproportionation system for formation of salts of polycarboxylic acids.

Other aspects, objects and the several advantages of this invention will be apparent from the following specification and claims.

In accordance with this invention, we have discovered that in the process for the formation of aromatic polycarboxylates by disproportionation of an alkali metal salt of the corresponding carboxylic acids, containing at least one less carboxyl group, an efficient system is achieved, giving good conversion to the desired alkali metal salts of said polycarboxylic acids which is operable at pressures lower than heretofore generally possible by carrying out the disportionation reaction in the presence of a conventional disproportionation catalyst and at least one adjuvant compound selected from those of the formulas:

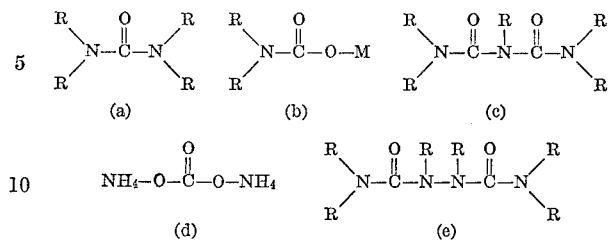

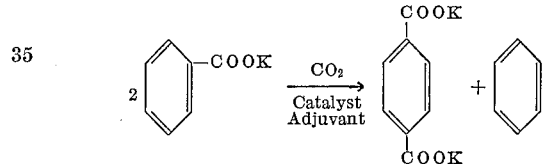

wherein R is hydrogen or an alkyl radical having from 1 to 4 carbon atoms therein and M is $NH_4$, Li, Na, K, Rb, or Cs.

Thus, by the present invention the conversion of an alkali metal aromatic carboxylate to the corresponding aromatic polycarboxylate having at least one additional carboxylate group which can be subsequently converted to the corresponding aromatic polycarboxylic acid is readily carried out in an efficient system when one or more adjuvant compounds of the formulas as above defined are utilized as a catalyst adjuvant.

In one presently preferred embodiment of this invention, we have discovered that an alkali metal benzoate is readily converted to the respective alkali metal salt of terephthalic acid at low pressure but in good yield by the addition of one or more of a urea, carbonate, biuret, ammonium carbonate or biurea compounds as an adjuvant to the conversion system.

The disproportionation process of this invention for potassium benzoate can be represented as follows:

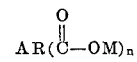

As starting materials for the process of this invention, in addition to the presently preferred alkali metal salts of benzoic acid, the salts of other aromatic mono- or polycarboxylic acids can be used. Such salts are those of the formula $$AR(\overset{O}{\overset{\|}{C}}-OM)_n$$

wherein AR is an aromatic or alkyl aromatic group having 6 to 15 carbon atoms therein, M is an alkali metal, and n is 1, 2 or 3.

In carrying out the conversion of compounds of the formula $AR(COOM)_n$ advantageously, the alkali metal salts, preferably the potassium salts or the sodium salts, are used. The lithium, rubidium and cesium salts can also be used for this reaction. In the place of the salts, mixtures can also be used which are transformed into the salts upon heating, for example, mixtures of carboxylic acid, anhydrides and alkali metal carbonates. Mixtures of salts of two different metals, for example, mixtures of the sodium and potassium salts, can be used.

Such salts are readily prepared from the corresponding acids. Such acids include, for example, benzoic acid, 2-naphthalene carboxylic acid, 4-biphenyl carboxylic acid, 2,6-naphthalene dicarboxylic acid, phthalic acid, isophthalic acid, terephthalic acid, 2-anthracenecarboxylic acid, 1,5-anthracenedicarboxylic acid, 1,5,9-anthracenetricarboxylic acid, 3-phenanthrenecarboxylic acid, 1,4,9-phenanthrenetricarboxylic acid, 2,3,4-trimethylbenzenecarboxylic acid, 2,4,6-trimethylbenezene-1,3-dicarboxylic acid, 2-ethyl-4-hexyl-6-methylbenzene-1,3-dicarboxylic acid, 2,4-dibutylbenzene-1,3,5-tricarboxylic acid, and the like. Also, mixtures of such acids may be used. In all of these carboxylic acids, the aromatic ring may carry alkyl radicals in addition to the carboxyl groups. If aromatic monocarboxylic acid salts are used as starting materials for the performance of the process according to the invention, the reaction products obtained thereby are industrially valuable dicarboxylic acid disalts and in many cases are those dicarboxylic acid disalts which have a symmetric structure, for example, terephthalic acid disalt, naphthalene-2,6-dicarboxylic acid disalt, and the like.

The aromatic polycarboxylates which are produced according to the process of this invention can be recovered by any means known to the art. It is also within the scope of this invention to convert such aromatic polycarboxylates into the respective aromatic polycarboxylic acids and subsequently recover such acids by any means known to the art.

For example, the reaction product is first dissolved in water. Subsequently, the salts formed by the reaction can be transformed into the corresponding free acids by acidifying the solution with organic or inorganic acids or by introducing carbon dioxide into the solution at atmospheric or elevated pressure, and then separating the free acids from the acidified solution. The individual reaction products may be separated from each other and isolated in pure form by methods which are based upon their different solubilities or volatilities and may thereafter, if desired, be transformed into their derivatives. The salt mixture produced by the reaction may also be transformed directly into derivatives of the acids, for example, into their esters or halides, and these derivatives may be purified, if desired, by fractional distillation.

The resulting polycarboxylic acids which are ultimately produced from the salts which are produced through use of the process of this invention are well known to the art and are useful for a variety of purposes.

For example, the process can be used to convert potassium benzoate to potassium terephthalate which is readily converted to terephthalic acid. Terephthalic acid has at least three major applications at present. Perhaps the most important of such applications is in the manufacture of synthetic fibers of the polyester type. Also of considerable importance is the use of terephthalic acid as an intermediate for the preparation of polyester film. Considerable quantities of terephthalic acid are also employed in the manufacture of terephthalic acid based plasticizers.

The process of this invention can be effected in a batchwise or continuous manner. Conventional equipment can be employed.

The process of this invention constitutes a further valuable improvement over prior art methods in that high pressures do not need to be employed to effect substantial yields. The resultant savings in equipment outlay and compression costs constitute a significant economic advantage.

It is essential to the process of this invention that at least one adjuvant compound of the formulas (as described above) be employed. Such adjuvants are generally employed in the range of about 0.001 to 2 mols per mol of alkali metal aromatic carboxylate, more preferably in the range of about 0.1 to 0.5 mol per mol of aromatic carboxylate.

Examples of suitable adjuvant compounds of the Formula (a) are urea, 1,1,3,3-tetrabutylurea, 1,1,3,3-tetramethylurea, 1,1-dimethylurea, 1,3-dimethylurea, 1-methyl-1-propylurea, 1-ethyl-3-propylurea, 1,1,3-trimethylurea, 1-butyl-1-ethyl-3-propylurea, methylurea, butylurea, propylurea and ethylurea.

Examples of suitable adjuvant compounds of the Formula (b) are: ammonium carbamate, sodium carbamate, potassium carbamate, lithium carbamate, rubidium carbamate, cesium carbamate, ammonium bis-methylcarbamate, sodium bisbutylcarbamate, potassium bis(1-methylpropyl)carbamate, lithium methylcarbamate, rubidium butylcarbamate, cesium 1-methylpropylcarbamate, ammonium propylcarbamate, and potassium ethylcarbamate.

Examples of suitable adjuvant compounds of the Formula (c) are: biuret, 1,1,3,5,5-pentabutylbiuret, 1,1,5,5-tetramethylbiuret, 1,1,5-tri(1-methylpropyl)biuret, 1,3,5-triethylbiuret, 1-butyl-3-ethyl-5-methylbiuret, 1,5-dibutyl-1,5-diethylbiuret, 1,1-dibutylbiuret, 1,5-di(2-methylpropyl)biuret, 1-methyl-3-propylbiuret, 1-butyl-5-methylbiuret, 1,1-dibutyl-3,5-diethylbiuret, 1,3-diethylbiuret and 1-(2-methylpropyl)-5-butylbiuret.

The adjuvant compound of Formula (d) is ammonium carbonate.

Examples of suitable adjuvant compounds of Formula (e) are: biurea, 1,1,3,4,6,6-hexabutylbiurea, 1,1,3,6,6-pentapropylbiurea, 1,1,3-tributyl-4,6,6-tri(1-methylpropyl)biurea, 1,1,6,6-tetramethylbiurea, 1,3,4,6-tetraethylbiurea, 1-butyl-1-ethyl-6-methyl-6-propylbiurea, 1-ethyl-3,4-dimethylbiurea, 1,1,3-trimethylbiurea, 1,3,4-tripropylbiurea, 1,3,6-tri(2-methylpropyl)biurea, 1-butyl-3-ethyl-6-methylbiurea, 1,1-dimethylbiurea, 1,6-dipropylbiurea, 1,3-dibutylbiurea, 1-ethyl-4-methylbiurea, 1-butyl-6-methylbiurea, 3,4-dimethylbiurea, 1-methylbiurea, and 3-(2-methylpropyl)biurea.

It is also essential to the process of this invention that a suitable catalyst be employed in the reaction medium. Generally, in the range of about 0.1 to 100 g. of catalyst per mol of alkali metal aromatic carboxylate are employed, more preferably in the range of 1 to 50 g. per gram mol are employed.

Catalysts which can be employed according to the process of this invention include cadmium, zinc, iron, lead and mercury, as well as compositions which contain these elements. The oxides and salts of the named metals, particularly oxides, carbonates and halides of the metals are preferred. The oxides, halides, and carbonates of zinc and cadmium are particularly preferred. Some examples of suitable catalytic compounds include metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, metallic zinc, zinc oxide, zinc iodide, zinc chloride, zinc sulphate, zinc phosphate, zinc phthalate, zinc isophthalate, and the like.

The conversion of the alkali metal carboxylate is effected substantially completely in the absence of oxygen or water. In general, temperatures in the range of about 350 to 500° C. are employed, more preferably in the range of 400 to 450° C.

The process is preferably carried out in an atmposhere which is at least 50 volume percent carbon dioxide with the remaining portion thereof being made up of inert gases which are substantially non-reactive in the reaction system. Examples of such inert gases are nitrogen, methane, argon, neon, butane, ethane and helium. In one presently preferred embodiment of this invention, the process is carried out in an atmosphere which is at least 90 volume percent carbon dioxide with the remaining portion thereof being made up of an inert gas.

Pressures in the range of 0 p.s.i.g. to 5000 p.s.i.g. or more can be employed but it is advantageous and preferable, in keeping with one preferred embodiment of the instant invention, that pressures in the range of 0 to 1000, preferably 0 to 10 p.s.i.g., be employed.

Sufficient reaction time should be employed to effect the desired degree of conversion. Generally reaction times in the range of about 5 minutes to about 48 hours are suitable.

Diluents for the reaction system can be employed as desired and can constitute up to 80 weight percent of the reaction mixture. Any diluent can be employed which is substantially nonreactive to the reaction environment. Examples of suitable diluents include heptane, benzene, naphthalene, particulate silica, particulate carbon, cyclohexane, and the like.

Although not required, the conversion can be effected in the presence of an alkali metal or an alkaline earth metal carbonate. Normally such compounds, when utililized, are employed in an amount in the range of about 0.1 to 100 g. of carbonate for each gram mol of alkali metal aromatic carboxylate, preferably in the range of 1 to 50 grams per gram mol. The presence of such compounds is conventionally considered to promote acid-binding in the system. In place of the carbonates the salts of other weak acids may be used, for example, the bicarbonates, formates, or oxalates.

If the starting materials are solids, they are preferably used in dry and finely divided form and are intimately mixed with each other. In order to avoid local overheating and decomposition caused thereby, as well as to avoid caking of the reaction mixture, it is sometimes advantageous to maintain the reaction mass in motion. This may be accomplished, for example, by carrying out the reaction in vessels provided with a stirring device, in screw conveyors or in rocker or rotary autoclaves. However, uniform heating may also be effected by distributing the starting materials in thin layers and in this method the reaction mixture may be agitated or may remain stationary. Good yields, however, are also obtained without these special measures provided care is taken that local overheating is avoided. The process may also be carried out in a fluidized bed of the solid starting materials.

The following examples will enable persons skilled in the art to better understand and practice the invention and are not intended to be limitative.

In each of the following examples, conversion was calculated by: 1, calculating the weight of benzoic acid which was equivalent to the weight of potassium benzoate which was converted to any product; 2, calculating the weight of benzoic acid which was equivalent to the weight of the potassium benzoate charged; 3, dividing the weight of benzoic acid calculated in 1 by the weight of benzoic acid calculated in 2; and 4, multiplying the value calculated in 3 by 100. Efficiency was calculated by determining the weight of potassium terephthalate formed, converting that weight to an equivalent weight of terephthalic acid, dividing that value by the weight of benzoic acid calculated in 1 above, and multiplying the resultant value by 100. Quantities of carboxylates and/or polycarboxylates were calculated by converting the carboxylates and/or polycarboxylates to the respective methyl esters by reaction with methanol and sulfuric acid, and subsequently determining the quantities of the respective methyl esters by gas chromatography in comparison with known authentic standards.

EXAMPLE I

A series of runs were carried out wherein a total of 3.2 g. of potassium benzoate, 0.40 g. of potasium carbonate, 0.20 g. of cadmium carbonate and varying amounts of urea, as indicated in table below, were charged to a reactor. Following blanketing of the reaction medium with carbon dioxide at 27° C. and 0 p.s.i.g., the reactors were sealed and heated to 432° C. for a period of 1 hour. All handling of the reactants prior to the sealing of the reactors was done in a dry box.

The following results were obtained.

| Run No. | Urea | Conversion | Efficiency | |
|---|---|---|---|---|
| 1 | 0.20 | 99 | 45 | [1] (66.1) |
| 2 | 0.10 | 99 | 42 | (61.6) |
| 3 | 0.05 | 99 | 55 | (81.0) |
| 4 (control) | 0.00 | <3 | | |

[1] Values of efficiency in parenthesis in all tables calculated on basis of one mol of potassium terephthalate formed per 2 mols of potassium benzoate reacted as 100 percent efficiency.

The above data show that the use of urea adjuvant according to the process of this invention effects considerably improved production of potassium terephthalate.

EXAMPLE II

In a further series of runs, 3.2 g. of potasium benzoate and 0.20 g. cadmium carbonate were charged to a vented reactor with urea in an amount as indicated below. Following the blanketing of the reactor with carbon dioxide at 27° C. and 0 p.s.i.g., the reactor was heated with venting of pressure to a temperature of 440° C. for a period of 1 hour.

The following results were obtained:

| Run No. | Urea (g.) | Conversion | Efficiency | |
|---|---|---|---|---|
| 1 | 0.025 | 62 | 66 | (97.0) |
| 2 | 0 | 9 | | |

The above data show that adequate conversion is obtained by the process of this invention at atmospheric pressure as well as with low concentrations of adjuvant.

EXAMPLE III

To show the lack of substantial effect of omission of the alkali metal carbonate from the system, a further run was carried out wherein 3.2 g. of potassium benzoate, 0.20 g. of cadmium carbonate and 0.025 g. of urea were charged to a reactor. Following the blanketing of the reactor with carbon dioxide, the reactor was sealed and heated to a temperature in the range of 436 to 440° C. for a period of 1 hour.

The following results were obtained:

Run No. 1:
   Urea _____ 0.025
   Conversion _____ 98
   Efficiency _____ 64 (93.1)

The above data show that adequate conversion and efficiency are obtained without an alkali metal carbonate when the adjuvant is urea.

EXAMPLE IV

A total of 3.2 g. of potassium benzoate and 0.20 g. cadmium carbonate were charged to a reactor in a series with varying amounts of ammonium carbonate as noted below. The reactor of each run was blanketed with $CO_2$ at 27° C. and 0 p.s.i.g., sealed and then heated to 436–440° C. for a period of 1 hour.

The following results were obtained:

| Run No. | $(NH_4)CO_3$, g. | Conversion | Efficiency | |
|---|---|---|---|---|
| 1 | 0.20 | 92 | 49 | (72.0) |
| 2 | 0.10 | 98 | 50 | (73.5) |
| 3 | 0.05 | 97 | 48 | (70.5) |

EXAMPLE V

Runs were carried out wherein a total of 3.20 g. of potassium benzoate, 0.20 g. of cadmium carbonate and amounts of biurea, as indicated, were charged to a reactor. Following blanketing of the reaction media with carbon dioxide at 27° C. and 0 p.s.i.g., the reactors were sealed and heated to 435° C. for a period of 1 hour. All handling of the reactants prior to the sealing of the reactors was done in a dry box.

| Run No. | Biurea (gms.) | Conversion | Efficiency | |
|---|---|---|---|---|
| 1 | 0.10 | 98 | 65 | (95.5) |
| 2 (control) | 0.00 | 6 | | |

EXAMPLE VI

A further run was carried out wherein a total of 3.20 grams of potassium benzoate, 0.20 g. of cadmium carbonate and 0.03 g. of biuret were charged to a 30 ml. reactor. Following blanketing of the reaction media with carbon dioxide at 27° C. and 0 p.s.i.g., the reactor was sealed and heated to an internal temperature of 435–439° C. for one hour. Analysis of the resulting products of the reaction gave a 98 percent conversion, 55 percent efficiency and 84 percent selectivity to terephthalate.

Reasonable variations and modifications of this invention can be made or followed in view of the foregoing disclosure without departing from the spirit or scope thereof.

We claim:

1. In the disproportionation process for the disproportionation of an alkali metal aromatic carboxylate of the formula $Ar(COOM)_n$ wherein Ar is an aromatic or alkyl aromatic hydrocarbon group having from 6–15 carbon atoms therein, said alkyl aromatic hydrocarbon group having up to three alkyl substituents each containing up to and including 6 carbon atoms, M is an alkali metal and $n$ is 1, 2 or 3 so as to form an aromatic polycarboxylate containing at least one additional carboxyl group by heating said aromatic carboxylate in an atmosphere containing at least 50 volume percent carbon dioxide and in the presence of a disproportionation catalyst, the improvement which comprises carrying out said disproportionation process in the presence of at least one adjuvant compound.

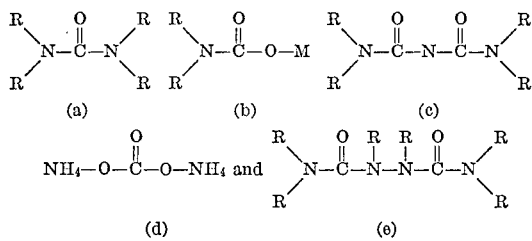

wherein R is hydrogen or an alkyl radical having from 1 to 4 carbon atoms therein and M is $NH_4$, Li, Na, K, Rb or Cs.

2. The process of claim 1 wherein said adjuvant is present in an amount in the range of about 0.001 to 2 mols per mol of alkali metal aromatic carboxylate.

3. The process of claim 1 wherein there is additionally present an alkali metal carbonate in an amount in the range of 0.1 to 100 g. of carbonate per gram mol of alkali metal aromatic carboxylate.

4. The process of claim 1 wherein there is additionally present an alkaline earth carbonate in an amount in the range of 0.1 to 100 g. of carbonate per gram mol of alkali metal aromatic carboxylate.

5. The process of claim 1 wherein said alkali metal aromatic carboxylate is potassium benzoate.

6. The process of claim 1 wherein said adjuvant is urea.

7. The process of claim 1 wherein said adjuvant is ammonium carbonate.

8. The process of claim 1 wherein said adjuvant is biuret.

9. The process of claim 1 wherein said adjuvant is biurea.

References Cited

UNITED STATES PATENTS 2,794,830   6/1957   Raecke et al. _____ 260—515
2,823,230   2/1958   Raecke _____ 260—515

JAMES A. PATTEN, Primary Examiner

V. GARNER, Assistant Examiner

UNITED STATES PATENT OFFICE
CERTIFICATE OF CORRECTION

Patent No. 3,631,094          Dated   December 28, 1971

Inventor(s)  John E. Mahan et al.

It is certified that error appears in the above-identified patent and that said Letters Patent are hereby corrected as shown below:

Column 7, line 15, claim 1, delete the period and insert therefor -- of the formulas: --.

Signed and sealed this 13th day of June 1972.

(SEAL)
Attest:

EDWARD M. FLETCHER, JR.          ROBERT GOTTSCHALK
Attesting Officer                Commissioner of Patents